United States Patent [19]

Tanaka et al.

[11] Patent Number: 5,585,459
[45] Date of Patent: Dec. 17, 1996

[54] PROCESS FOR PRODUCING RAW RUBBER

[75] Inventors: Yasuyuki Tanaka, Tokyo; Yuichi Hioki; Masaharu Hayashi, both of Wakayama; Naoya Ichikawa; Toshiaki Sakaki, both of Hyogo, all of Japan

[73] Assignees: Kao Corporation, Tokyo; Sumitomo Rubber Industries, Ltd., Hyogo, both of Japan

[21] Appl. No.: 241,714

[22] Filed: May 12, 1994

[30] Foreign Application Priority Data

May 13, 1993 [JP] Japan .................................. 5-111766
May 13, 1993 [JP] Japan .................................. 5-111767

[51] Int. Cl.⁶ .............................. C08C 1/14; C08C 1/15; C08C 1/04
[52] U.S. Cl. .............. 528/486; 528/1; 528/488; 528/489; 528/491; 528/502; 524/376; 524/498; 524/575.5
[58] Field of Search .................. 528/487, 486, 528/488, 502, 1, 931, 934, 932; 524/376, 498, 903, 925, 929

[56] References Cited

U.S. PATENT DOCUMENTS

| | | | |
|---|---|---|---|
| 2,061,276 | 11/1936 | Ingmanson | 528/932 |
| 2,097,481 | 11/1937 | Wallerstein | 528/932 |
| 2,399,156 | 4/1946 | Stamberger et al. | 528/932 |
| 3,761,455 | 9/1973 | Tanaka et al. | 528/488 |
| 4,379,095 | 4/1983 | Oldack | 524/376 |
| 4,455,265 | 6/1984 | Haldeman | 524/925 |

FOREIGN PATENT DOCUMENTS

| | | |
|---|---|---|
| 309245 | 4/1929 | United Kingdom . |
| 1192407 | 5/1970 | United Kingdom . |
| 2098222 | 11/1982 | United Kingdom . |

*Primary Examiner*—Paul R. Michl
*Assistant Examiner*—Olga Asinovsky
*Attorney, Agent, or Firm*—Sughrue, Mion, Zinn, Macpeak & Seas

[57] ABSTRACT

A process for producing raw rubber from a deproteinized natural rubber is disclosed, which comprises coagulating rubber particles in the deproteinized natural rubber latex by: (1) adding a nonionic surfactant having a cloud point of from 20° to 100° C. and a molecular weight of 300 or more to the deproteinized natural rubber latex and heating the latex to a temperature not lower than the cloud point of the nonionic surfactant; or (2) adding a coagulation assistant selected from the group consisting of: (a) an anionic surfactant, (b) an amphoteric surfactant, (c) a nonionic surfactant, (d) a nonionic or amphoteric oligomer or polymer, and (e) an anionic oligomer or polymer, to the deproteinized natural rubber latex; and then recovering the coagulated rubber particles. According to the process of the present invention, raw rubber containing substantially no metal ion can be produced with a high efficiency.

2 Claims, No Drawings

PROCESS FOR PRODUCING RAW RUBBER

FIELD OF THE INVENTION

The present invention relates to a process for producing raw rubber. More particularly, the present invention relates to a process for producing raw rubber comprising coagulating rubber particles in a deproteinized natural rubber latex.

BACKGROUND OF THE INVENTION

Natural rubber has hitherto been used widely as industrial products, such as automobile tires, belts and pressure-sensitive adhesives, and household goods, such as gloves. These natural rubber articles are generally produced by coagulating the rubber content of a natural rubber latex to obtain raw rubber called crepe rubber or smoked sheet rubber, and further processing the raw rubber through steps of mastication, compounding of additives, molding, and vulcanization.

It was recently reported that medical tools made of natural rubber, such as surgical gloves, various catheters, and analgesic masks, provoke labored respiration or anaphylactoid symptoms, such as vascular edema, nettle rash, detelectasis and cyanosis, in patients. Cases were also reported in which women with a history of allergy suffered a pain in the hands, nettle rash or vascular edema around the eyes when they used rubber gloves made of natural rubber.

These symptoms seem to be attributed to the protein present in natural rubber. Food and Drug Administration (FDA), U.S.A. has called on manufactures of natural rubber to reduce the protein content. It has therefore been demanded to remove protein from natural rubber.

Natural rubber is obtained from Hevea trees as a latex containing a rubber content, water, protein, inorganic salts, and other impurities. The latex oozing out from the tapped trunk of a rubber plant is collected in a cup, gathered at a refining factory where it is coagulated to obtain raw rubber (crepe rubber or smoked sheet rubber) or concentrated by centrifugation to obtain a purified latex.

The protein content in natural rubber has usually been expressed in terms of a nitrogen content (N %) determined by a Kjeldahl method multiplied by 6.3. The present inventors discovered that the proteins in raw rubber obtained from a latex can be confirmed by infrared absorption at 3280 $cm^{-1}$ characteristic of polypeptide.

The present inventors previously found that a deproteinized natural rubber latex showing no IR absorption at 3280 $cm^{-1}$ can be obtained by a process comprising treating a natural rubber latex with a protease and a surfactant either simultaneously or successively and, after allowing the system to stand for a given period of time, recovering the rubber particles by centrifugation (see Japanese Patent Application Nos. 208754 to 208758/92 (corresponding to EP-A-0 584 597)).

As a method for recovering the rubber particles from natural rubber latex, a method comprising adding an acid (e.g., formic acid and acetic acid) to a latex and a method comprising adding an inorganic salt (e.g., calcium chloride, aluminum sulfate and calcium nitrate) are generally known.

For example, a latex is diluted to have a solids content of about 15 to 20% by weight, and formic acid is subsequently added thereto in a concentration of from 0.1 to 1% by weight to agglomerate the rubber particles, which is then separated, washed and dried to recover it.

As compared with the general latex on the market, the above-mentioned deproteinized latex is very poor in the mechanical stability. However, in contrast, when it is attempted to recover the rubber content in the deproteinized latex by addition of an acid, the deproteinized latex causes only insufficient agglomeration to recover the rubber content. On the other hand, when the above-mentioned method wherein an inorganic salt is added to undergo agglomeration is employed, metal ions are unavoidably incorporated into the resulting solid rubber, which causes problems such as reductions in physical properties due to moisture absorption, blooming, retardation of vulcanization, and a reduction in resistance to deterioration on aging.

SUMMARY OF THE INVENTION

An object of the present invention is to provide a process for producing raw rubber from a deproteinized natural rubber latex with a high efficiency.

Another object of the present invention is to provide a process for producing raw rubber from a deproteinized natural rubber latex without incorporating metallic ions into the raw rubber.

As a result of extensive investigation, the present inventors have found that raw rubber containing no metal ions can be produced from a deproteinized natural rubber latex with high efficiency by adding a specific nonionic surfactant to the latex and then heating the resulting latex, or by adding a specific surfactant or a specific oligomer or polymer to the latex and further adding thereto an acid, such as formic acid or acetic acid.

Namely, the present invention provides a process for producing raw rubber which comprises coagulating rubber particles in a deproteinized natural rubber latex by:

(1) adding a nonionic surfactant having a cloud point of from 20° to 100° C. and a molecular weight of 300 or more to the deproteinized natural rubber latex and heating the latex to a temperature not lower than the cloud point of the nonionic surfactant; or (2) adding a coagulation assistant selected from the group consisting of:

(a) an anionic surfactant,
(b) an amphoteric surfactant,
(c) a nonionic surfactant,
(d) a nonionic or amphoteric oligomer or polymer, and
(e) an anionic oligomer or polymer to the deproteinized natural rubber latex; and then recovering the coagulated rubber particles.

DETAILED DESCRIPTION OF THE INVENTION

The nonionic surfactant which can be used as a coagulating agent in the step (1) of the process of the present invention has a cloud point of from 20° to 100° C. and a molecular weight of 300 or more, preferably a cloud point of from 20° to 100° C. and a molecular weight of 1,000 or more, more preferably a cloud point of from 20° to 80° C. and a molecular weight of 1,000 or more.

A nonionic surfactant having a cloud point of less than 20° C. is difficult to handle at room temperature, while a nonionic surfactant having a cloud point exceeding 100° C. is difficult to exhibit coagulating effect to the deproteinized natural rubber latex. On the other hand, a nonionic surfactant whose molecular weight is less than 300 is difficult to efficiently coagulate the rubber content. The molecular weight of the nonionic surfactant as referred herein is an average molecular weight. The average molecular weight of the copolymer and condensate nonionic surfactants can be determined, for example, by analysis with an aqueous GPC (liquid chromatography) using sodium polystyrenesulfonate as standard, while the average molecular weight of the nonionic surfactant other than the copolymer and the condensate can be determined, for example, by the measurement of its hydroxyl group value and calculation based on the molecular weight of KOH.

Specific examples of the nonionic surfactant as the coagulating agent include polyoxyalkylene ethers, organopolysiloxane-polyoxyalkylene copolymers, polyoxyalkylene adducts of a formalin condensate of phenol or an alkylphenol, and polyoxyalkylene adducts of bisphenol A or bisphenol S.

The nonionic surfactant is preferably used in an amount of from 0.01 to 10% by weight, more preferably from 0.1 to 5% by weight, based on the solids content of the deproteinized natural rubber latex. If the amount is less than 0.01% by weight, the coagulating effect is insufficient. On the other hand, if the amount exceeds 10% by weight, it is uneconomical and the content of the surfactant remaining in the resulting raw rubber increases.

The nonionic surfactant which can be used in the present invention includes polyoxyalkylene esters, polyoxyalkylene ethers, polyoxyalkylene polyhydric alcohol esters, polyoxyalkylene sugar fatty acid esters, organopolysiloxane-polyoxyalkylene copolymers, polyoxyalkylene adducts of phenol- or alkylphenol-formalin condensates, and polyoxyalkylene adducts of bisphenol A or S.

Examples of the polyoxyalkylene group in the above-illustrated nonionic surfactants include those having an alkylene group containing 2 to 4 carbon atoms. The number of added moles of ethylene oxide, for example, is from about 1 to about 300, preferably from about 5 to about 300.

These nonionic surfactants may be used either individually or in combination of two or more thereof selected appropriately.

The nonionic surfactant may be added to the latex immediately after deproteinizing process of the natural rubber latex or before the deproteinizing process of the natural rubber latex. In general, it is preferred that the nonionic surfactant is added to the latex after deproteinizing process of the natural rubber latex.

In the coagulation step (1) in the process of the present invention, a deproteinized natural rubber latex containing the nonionic surfactant as a coagulating agent is heated to a temperature not lower than the cloud point of the nonionic surfactant. The order of the addition of the coagulating agent (the nonionic surfactant) and the heating is not limited, and the latex may previously be heated before addition of the coagulating agent, or addition of the coagulating agent may be followed by heating.

The coagulation assistant which can be used in the step (2) of the process of the present invention is explained below in detail.

The anionic surfactant as coagulation assistant (a) includes carboxylic acid surfactants, sulfonic acid surfactants, sulfuric ester surfactants and phosphoric ester surfactants.

Examples of the carboxylic acid surfactant include fatty acid salts containing from 6 to 30 carbon atoms, polycarboxylic acid salts, rosinates, dimer acid salts, and tall oil fatty acid salts, with carboxylic acid salts containing from 10 to 30 carbon atoms being preferred. Those having more than 30 carbon atoms tend to be difficult to disperse in water. Preferred examples of the polycarboxylic acid include straight-chain or aromatic, saturated or unsaturated dicarboxylic and tricarboxylic acid which may be substituted by hydroxy, amino, ketone group, such as citric acid, ketoglutaric acid, succinic acid, fumaric acid, maleic acid, malic glutamic acid, asparagic acid, phthalic acid, trimellitic acid and pyromellitic acid.

Examples of the sulfonic acid surfactant include alkylbenzenesulfonates, alkylsulfonates, alkylnaphthalenesulfonates, naphthalenesulfonates, diphenyl ether sulfonates, α-olefin sulfonates, dialkyl sulfosuccinates, α-sulfonated fatty acid salts, and methyloleyl taurine. Among them, alkylbenzenesulfonates, alkylnaphthalenesulfonates and dialkylsulfosuccinates wherein the alkyl moiety has from 6 to 30 carbon atoms, preferably from 8 to 20 carbon atoms.

Examples of the sulfuric ester surfactant include alkylsulfuric ester salts, polyoxyalkylene alkylsulfuric ester salts, polyoxyalkylene alkylphenyl ether sulfuric ester salts, polyoxyalkylene tristyrenated phenol sulfuric ester salts, and polyoxyalkylene distyrenated phenol sulfuric ester salts. Among them, alkylsulfuric ester salts, polyoxyalkylene alkylsulfuric ester salts, polyoxyalkylene alkylphenyl ether sulfuric ester salts, and polyoxyalkylene distyrenated phenol sulfuric ester salts. Examples of the polyoxyalkylene group include those comprising from 1 to 100 mol, preferably from 1 to 50 mol, of an alkylene oxide having 2 to 4 carbon atoms, preferably from 2 to 3 carbon atoms. Examples of the alkyl group include those having 6 to 30 carbon atoms, preferably from 8 to 20 carbon atoms.

Examples of the phosphoric ester surfactant include alkyl phosphoric ester salts and polyoxyalkylene phosphoric ester salts. Preferred examples thereof include alkyl phosphoric ester salts wherein the alkyl moiety has from 8 to 20 carbon atoms, and polyoxyalkylene phosphoric ester salts wherein the polyoxyalkylene moiety comprises from 1 to 100 mol, preferably from 1 to 50 mol, of an alkylene oxide having from 2 to 3 carbon atoms.

The salts of these compounds as coagulation assistant (a) include salts with a metal (e.g., Na, K, Ca, Mg or Zn), ammonia salts, and amine salts (e.g., triethanolamine salt).

The amphoteric surfactant as coagulation assistant (b) includes amino acid surfactants, betaine surfactants, and amine oxide surfactants.

Preferred examples of the amino acid surfactant include monoalkylaminoalkylene carboxylic acid salts and dialkylaminoalkylene carboxylic acid salts.

Preferred examples of the betaine surfactant include alkyldimethylcarboxymethylammonium betaines, trialkylsulfoalkyleneammonium betaines, dialkylbispolyoxyalkyleneammonium sulfuric ester betaines, alkylcarboxymethylhydroxyethylimidazolinium betaines. Among them, alkyldimethylcarboxymethylammonium betaines are more preferred.

Preferred examples of the amine oxide surfactant include alkyldimethylamine oxides.

In the above-mentioned amphoteric surfactants, examples of the alkyl group include an alkyl group containing from 6 to 30 carbon atoms, preferably from 8 to 20 carbon atoms, and more preferably from 10 to 16 carbon atoms.

The nonionic surfactant as coagulation assistant (c) includes polyoxyalkylene ether surfactants, polyoxyalkylene ester surfactants, polyhydric alcohol fatty acid ester surfactants, sugar fatty acid surfactants, and alkyl polyglucoside surfactants.

Examples of the polyoxyalkylene ether surfactant include polyoxyalkylene alkyl ethers, polyoxyalkylene alkylphenyl ethers, polyoxyalkylene polyol alkyl ethers, polyoxyalkylene styrenated phenol ethers, and polyoxyalkylene tristyrenated phenol ethers. Examples of the polyol of the polyoxyalkylene polyol alkyl ethers include polyhydric alcohols having 2 to 12 carbon atoms, such as propylene glycol, glycerin, sorbitol, glucose, sucrose, pentaerythritol, and sorbitan. Among them, polyoxyalkylene alkyl ethers and polyoxyalkylene alkylphenyl ethers are preferred.

Examples of the polyoxyalkylene ester include polyoxyalkylene fatty acid esters.

Examples of the polyhydric alcohol fatty acid ester include fatty acid esters of a polyhydric alcohol containing 2 to 12 carbon atoms and fatty acid esters of a polyoxyalkylene polyhydric alcohol. Specific examples thereof include a sorbitol fatty acid ester, a sorbitan fatty acid ester, a fatty acid monoglyceride, a fatty acid diglyceride, and a polyglycerin fatty acid ester. Polyalkylene oxide adducts of these ester compounds, such as a polyoxyalkylene sorbitan fatty acid ester and a polyoxyalkylene glycerin fatty acid ester, may also be used. Among them, fatty acid esters of a polyhydric alcohol is preferred. More specific examples thereof include polyoxyalkylene sorbitol fatty acid esters, polyoxyalkylene sorbitan fatty acid esters, polyoxyalkylene glycerin fatty acid esters and polyglycerin fatty acid esters.

Examples of the sugar fatty acid ester include a fatty acid ester of sucrose, glucose, maltose, fructose or a polysaccharide. A polyalkylene oxide adduct of these esters may also be used. Among them, a fatty acid ester of sucrose is preferred.

Examples of the alkyl polyglucoside include an alkylglucoside and an alkyl polyglucoside. Fatty acid esters of these compounds may also be used. Polyalkylene oxide adducts of these compounds are also employable. Among them, an alkyl polyglucoside and a polyoxyalkylene oxide adduct of an alkylglucoside are preferred.

In the above-mentioned nonionic surfactants, examples of the alkyl group include an alkyl group containing from 4 to 30 carbon atoms. The polyoxyalkylene group includes those having an alkylene group containing from 2 to 4 carbon atoms. The number of moles of an added alkylene oxide, e.g., ethylene oxide, is from about 1 to 50. The fatty acid includes straight-chain or branched and saturated or unsaturated fatty acids containing from 4 to 30 carbon atoms.

The nonionic or amphoteric oligomer or polymer as coagulation assistant (d) includes polyvinyl alcohol, polyethylene glycol, ethylene oxide-propylene oxide copolymers, hydroxyethyl cellulose, hydroxypropyl cellulose, methyl cellulose, and starch derivatives.

The anionic oligomer or polymer as coagulation assistant (e) includes:
(i) a water-soluble or water-dispersible polymer comprising one or more monomers selected from an unsaturated carboxylic acid and a derivative thereof,
(ii) a water-soluble or water-dispersible polymer comprising an unsaturated sulfonic acid or a derivative thereof,
(iii) a formalin condensate of a sulfonated polycyclic aromatic compound which may contain a hydrocarbon group as a substituent, and
(iv) a mixture of two or more of (1) to (3).

The above-mentioned polymer (i) may be prepared from one or more monomers selected from unsaturated monocarboxylic acids (e.g., acrylic acid, methacrylic acid), dicarboxylic acids (e.g., maleic acid), alkali metal salts thereof (e.g., sodium salts), ammonium salts thereof, and organic amine salts thereof (e.g., triethanolamine salts). These monomers may be used in combination with copolymerizable monomers therewith such as vinyl acetate, isobutylene, diisobutylene, styrene, alkyl acrylates, alkyl methacrylates, hydroxyethyl(meth)acrylate, polyoxyethylene (meth)acrylate, (meth)acrylamide, and diaceton acrylamide.

These monomers can be polymerized or copolymerized in a conventional manner. The proportion of the monomer components and the polymerization degree of the polymer or copolymer to be obtained are not specifically restricted but it is necessary that the resulting polymer or copolymer should be water-soluble or water-dispersible.

Specific examples of the polymer (i) include acrylic acid polymer, methacrylic acid copolymer, acrylic acid/methacrylic acid copolymer, acrylic acid/polyoxyethylene methacrylic ester copolymer, acrylic acid/methyl acrylate copolymer, acrylic acid/vinyl acetate copolymer, acrylic acid/maleic acid copolymer, maleic acid/isobutylene copolymer, maleic acid/styrene copolymer, and alkali metal, ammonia and organic amine salts thereof. These polymers and copolymers may be used alone or in combination of two or more of them.

Examples of the above-mentioned polymer (2) include those prepared by polymerizing the unsaturated sulfonic acid, such as styrenesulfonic acid, 2-acrylamide-2-methylpropanesulfonic acid, vinylsulfonic acid, methacrylsulfonic acid, acrylsulfonic acid and the like, or by copolymerizing the unsaturated sulfonic acid with another monomer, such as hydrophobic monomers (e.g., alkyl acrylate, alkyl methacrylate, vinyl alkyl ether, vinyl acetate, ethylene, propylene, butylene, butadiene, diisobutylene, vinyl chloride, vinylidene chloride, acrylonitrile, and styrene), hydrophilic monomers (e.g., acrylic acid, methacrylic acid, maleic acid, fumaric acid, maleic anhydride, vinyl alcohol, acrylamide, methacrylamide, diacetoneacrylamide, N-vinyl-pyrrolidone, 2-acrylamide-2-methylpropanesulfonic acid, methallylsulfonic acid, xylenesulfonic acid, and naphthalenesulfonic acid). Among them, polymers and copolymers of a styrenesulfonic acid salt are more preferred.

The polymer of a styrenesulfonic acid salt may be prepared by polymerizing a styrenesulfonic acid salt or sulfonating a polystyrene. The polymer of styrenesulfonic acid salt has a structure represented by the following formula:

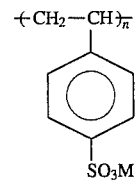

The molecular weight of the polymer of a styrenesulfonic acid salt is preferably from 1,000 or more, more preferably from 10,000 to 3,000,000. In the above formula, M represents an alkali metal (e.g., lithium, sodium, potassium), an ammonium group, an alkylamine or an alkanolamine.

The copolymer of a styrenesulfonic acid salt may be prepared by copolymerizing a styrenesulfonic acid salt with another monomer or sulfonating a copolymer of styrene with another monomer. Preferred examples of the copolymer include a (meth)acrylic acid-styrenesulfonic acid copolymer. In this copolymer, the molar ratio of (meth)acrylic acid residue and styrenesulfonic acid is preferably from 1/10 to 10/1, more preferably from 1/3 to 7/1. The average molecular weight thereof is preferably from 1,000 to 1,000,000, more preferably from 10,000 to 700,000. Examples of the salt of the copolymer include sodium salts, potassium salts, ammonium salts, diethanolamine salts, triethanolamine salts, monoisopropanolamine salts, diisopropanolamine salts, triisopropanolamine salts, and 2-amino-2-methylpropane-1,3-diol salts. In this instance, unneutralized portions may be remained in the copolymer so long as they deteriorate the properties of the copolymer.

The above-mentioned condensate (iii) may be prepared by subjecting naphthalene, alkyl-substituted benzene, alkyl-substituted naphthalene, anthracene, alkyl-substituted anthracene, lignin, or compounds having an aromatic ring contained in petroleum residue to sulfonating reaction in a conventional manner, and subsequently to salt formation reaction and formaldehyde condensation. In this instance, the polymerization degree is preferably from 2 to 30, more preferably from 3 to 10. When the polymerization degree is less than 2, the effect of condensation is not fully achieved, whereas when the polymerization degree is more than 30, the molecular weight of the polymer becomes high, which may be disadvantageous in solubility in water, for example.

As the aromatic compound, various kinds of aromatic compounds may be used and preferred examples thereof include lignin, xylene, toluene, naphthalene and alkylnaphthalene wherein the alkyl moiety has from 1 to 6 carbon atoms. These aromatic compounds may be used alone or in combination of two or more of them.

Specific examples of the condensate (iii) include formalin condensates of petroleum sulfonic acid derivatives, lignin sulfonate acid derivatives, naphthalene sulfonate derivatives, xylene sulfonate derivatives and alkylbenzene sulfonate derivatives. Examples of the salt thereof include alkali metal (e.g., sodium, potassium) salts, alkaline earth metal (e.g., calcium) salts, amine salts, ammonium salts and the like.

Preferred examples of coagulation assistant (e) includes a styrene-sulfonic acid copolymer, a homo- or copolymer of acrylamide t-butylsulfonic acid, a homo- or copolymer of a vinylsulfonate, a homo- or copolymer of a 3-sulfopropyl-(meth)acrylic ester salt, a formalinnaphthalenesulonic acid condensate, lignin sulfonic acid, a polycyclic aromatic sulfonic acid copolymer, a homo- or copolymer of acrylic acid and maleic anhydride, and an isobutylene- or diisobutylene-maleic anhydride copolymer.

Among coagulation assistants (a) to (e), (a), (b), (c) and (e) are preferred and (a), (b) and (e) are further preferred.

The coagulation assistant according to the present invention is added to a deproteinized natural rubber latex in combination with an acid.

The acids which can be used in the step (2) of the process of the present invention as a coagulating agent include formic acid, acetic acid and, phosphoric acid and hydrochloric acid. The acid is added to the deproteinized natural rubber latex in such an amount to give a pH value of not higher than 7, preferably of from 3 to 6.

The coagulation assistant according to the present invention is added to the deproteinized natural rubber latex so as to give a concentration of from 0.01 to 10% by weight, and preferably from 0.1 to 5% by weight, based on the weight of the latex. If the concentration of the coagulating assistant is less than 0.01%, sufficient effect cannot be obtained. Concentrations exceeding 10% are only uneconomical.

Addition of the coagulation assistant may be either before or after addition of the acid, and preferably before addition of the acid.

After addition of the acid and the coagulation assistant, the latex is allowed to stand or stirred at room temperature to cause the rubber particles to be coagulated and precipitate. If necessary, coagulation by the step (2) in the process of the present invention may be effected while heating the latex.

According to the process of the present invention, the coagulation steps (1) and (2) may be carried out either individually or in combination therewith.

After coagulation, the coagulated rubber particles are separated from the mixture in a conventional manner, thoroughly washed with water and then dried. In this instance, when the nonionic surfactant is used as the coagulating agent, it is preferable that the temperatures of the washing water and the rubber particles are controlled at or lower than the cloud point of the nonionic surfactant for efficiently removing the nonionic surfactant or other surfactants.

As stated above, the raw rubber produced in the process of the present invention has extremely reduced contents of metal ions and surfactants as compared with the one recovered by using a metal salt as a coagulating agent.

The present invention will now be illustrated in greater detail with reference to Examples, but it is to be understood that the present invention should not be construed as being limited thereto. All the percents and ratios shown below are by weight unless otherwise noted.

EXAMPLES 1 TO 6 AND COMPARATIVE EXAMPLES 1 AND 2

A high ammonia latex of natural rubber was treated with a protease (alkali protease) and a surfactant (a 60:40 mixture of sodium dodecylbenzenesulfonate and polyoxyethylene (9 mol) lauryl ether) to prepare a deproteinized natural rubber latex showing no absorption of polypeptide at 3280 cm$^{-1}$ in the IR spectrum. One part of a 10% aqueous solution of the nonionic surfactant shown in Table 1 below was added to 100 parts (on a solid basis) of the resulting deproteinized natural rubber latex (solids content: 30%) in a test tube, and the mixture was heated in a hot water bath at 90° C. for 5 minutes. The state of coagulation after heating was evaluated with the naked eye and rated "good" (the rubber content was coagulated) or "bad" (the rubber content was not coagulated). The results obtained are shown in Table 1.

For control, the same deproteinized natural rubber latex as used above but containing no coagulating agent (nonionic surfactant) was tested in the same manner. The result obtained is also shown in Table 1.

TABLE 1

| Example No. | Nonionic Surfactant | Cloud Point (°C.) | Molecular Weight | Coagulation Property |
|---|---|---|---|---|
| 1 | Nonylphenol EO$^{1)}$(8.1)$^{3)}$ adduct | 23 | 576 | good |
| 2 | Nonylphenol EO(20) PO$^{2)}$(14) adduct | 40 | 1880 | good |
| 3 | Bisphenol EO(75) PO(20) adduct | 62 | 3530 | good |
| 4 | Dimethylpolysiloxane EO(20) PO(8) copolymer | 50 | 40000 | good |
| 5 | Lauryl alcohol EO(20) adduct | 88 | 1730 | good |

TABLE 1-continued

| Example No. | Nonionic Surfactant | Cloud Point (°C.) | Molecular Weight | Coagulation Property |
|---|---|---|---|---|
| 6 | Oleyl alcohol EO(9) adduct | 55 | 610 | good |
| Comparative Example 1 | Nonylphenol EO(84) adduct | exceeding 100 | 3920 | bad |
| Comparative Example 2 | Decyl alcohol EO(2) adduct | less than 20 | 247 | bad |
| Control | None | — | — | bad |

Note:
[1] EO: ethylene oxide
[2] PO: propylene oxide
[3] The numbers in parentheses are average mole numbers of EO or PO added per molecule of the adduct.

It is seen from Table 1 that a nonionic surfactant having a cloud point outside of the range of 20° to 100° C. and a molecular weight of less than 300 produces no effect (Comparative Example 2) and neither does a nonionic surfactant having a molecular weight of 300 or more but a cloud point outside of the above range (Comparative example 1). To the contrary, in Examples 1 to 6 nonionic surfactants whose cloud point and molecular weight fall within the respective range according to the present invention exhibit satisfactory effect of coagulation.

EXAMPLES 7 TO 18 AND COMPARATIVE EXAMPLE 3

A high ammonia latex of natural rubber was treated with a protease (alkali protease) and a surfactant (a 60:40 mixture of sodium dodecylbenzenesulfonate and polyoxyethylene (9 mol) lauryl ether) to prepare a deproteinized latex showing no absorption of polypeptide at 3280 cm$^{-1}$ in the IR spectrum. Each of the coagulation assistants shown in Table 2 below was added thereto to give the concentration shown in Table 2, and the latex was diluted to a total solids content of 15%. To the latex was added 20% formic acid to give a final concentration of 0.5%. After allowing the system to stand for 24 hours, the state of coagulation was evaluated with the naked eye and rated "good" (the rubber content was coagulated) or "bad" (the rubber content was not coagulated). The results obtained are shown in Table 2.

For comparison, a deproteinized latex containing 0.005% of sodium laurylsulfate as a coagulating assistant and, as a control, a deproteinized natural rubber latex containing no coagulating assistant were tested in the same manner. The results obtained are also shown in Table 2.

TABLE 2

| Example No. | Coagulation Assistant | Concentration (% by weight) | Coagulation Properties |
|---|---|---|---|
| 7 | Sodium laurylsulfate (Emal 10 powder*[1]) | 1.0 | good |
| 8 | Potassium oleate (FR-14*[2]) | 0.5 | good |
| 9 | Sodium-dodecyl-benzene sulfonate (Neopelex F-65*[3]) | 0.5 | good |
| 10 | Polyoxyethylene (9) nonylphenyl ether (Emulgen 909*[4]) | 3.0 | good |
| 11 | Polyoxyethylene (20) sorbitan monooleate (Rheodor TWO-120*[5]) | 5.0 | good |
| 12 | Sodium lauryl phosphate | 2.0 | good |
| 13 | Hexaglycerin monooleate (polymerization degree: 6) | 2.5 | good |
| 14 | Polyoxyethylene (10) monooleate (Emanon 4110*[6]) | 3.0 | good |
| 15 | Laurylglucoside | 1.0 | good |
| 16 | Sodium salt of formalin-naphthalene-sulfonic acid condensate (Demol N*[7]) (number of condensation (n) = 5) | 1.0 | good |
| 17 | Lauroyl acetobetaine (Amphitol 20BS*[8]) | 2.0 | good |
| 18 | Polyvinyl alcohol (saponification degree: 78.5–81.5 mol %) | 2.5 | good |
| Comparative Example 3 | Sodium laurylsulfate | 0.005 | bad |
| Control | None | — | bad |

Note:
*[1] to *[8] are all trade names of Kao Corporation.

As is apparent from Tables 1 and 2, raw rubber can be produced from a deproteinized natural rubber latex in the process of the present invention with a high efficiency.

As described and demonstrated above, the process of the present invention can produce raw rubber from a deproteinized natural rubber latex with a high efficiency. Further, since the raw rubber produced in the process of the present invention substantially does not contain metallic ions, it does not cause problems such as reductions in physical properties due to moisture absorption, blooming, retardation of vulcanization, and a reduction in resistance to deterioration on aging.

While the present invention has been described in detail and with reference to specific examples thereof, it will be apparent to one skilled in the art that various changes and modifications can be made therein without departing from the spirit and scope thereof.

What is claimed is:

1. A process for producing raw rubber which comprises coagulating rubber particles in a deproteinized natural rubber latex by adding a nonionic surfactant having a cloud point of from 20° to 100° C. and a weight average molecular weight of 300 or more to the deproteinized natural rubber latex and heating the latex to a temperature not lower than the cloud point of the nonionic surfactant.

2. The process of claim 1, wherein said nonionic surfactant having a cloud point of from 20° to 100° C. and a molecular weight of 300 or more is added in an amount of from 0.01 to 10% by weight based on the solids content of the deproteinized natural rubber latex.

* * * * *